(12) United States Patent
Siekmanmn et al.

(10) Patent No.: US 8,970,442 B2
(45) Date of Patent: Mar. 3, 2015

(54) ANTENNA WITH ANGLED CORE APPARATUS AND METHOD

(75) Inventors: Daniel Siekmanmn, Kaldeweistrasse (DE); Lars Hanschmann, Halle (DE)

(73) Assignee: Hella KGAA, Lippstadt (DE)

( * ) Notice: Subject to any disclaimer, the term of this patent is extended or adjusted under 35 U.S.C. 154(b) by 72 days.

(21) Appl. No.: 13/490,036

(22) Filed: Jun. 6, 2012

(65) Prior Publication Data

US 2012/0313829 A1    Dec. 13, 2012

(30) Foreign Application Priority Data

Jun. 7, 2011  (DE) .......................... 10 2011 104 878

(51) Int. Cl.
| | | |
|---|---|---|
| *H01Q 7/08* | (2006.01) | |
| *B60R 16/02* | (2006.01) | |
| *H01Q 1/32* | (2006.01) | |
| *H01Q 1/38* | (2006.01) | |
| *H01Q 7/06* | (2006.01) | |
| *H02J 17/00* | (2006.01) | |
| *H02B 5/00* | (2006.01) | |

(52) U.S. Cl.
CPC *B60R 16/02* (2013.01); *H01Q 1/32* (2013.01); *H01Q 1/3241* (2013.01); *H01Q 1/3291* (2013.01); *H01Q 1/38* (2013.01); *H01Q 7/06* (2013.01); *H01Q 7/08* (2013.01); *H02J 17/00* (2013.01); *H02B 5/00* (2013.01)
USPC .......................................... 343/788; 343/711

(58) Field of Classification Search
USPC .................... 343/711, 787, 788, 867
See application file for complete search history.

(56) References Cited

U.S. PATENT DOCUMENTS

| | | | | |
|---|---|---|---|---|
| 8,077,106 | B2 * | 12/2011 | Sato .............................. | 343/788 |
| 2007/0247387 | A1 * | 10/2007 | Kubo et al. .................... | 343/787 |
| 2012/0112978 | A1 * | 5/2012 | Ito et al. ........................ | 343/788 |
| 2013/0181876 | A1 * | 7/2013 | Miura et al. .................. | 343/788 |
| 2013/0249758 | A1 * | 9/2013 | Yosui et al. .................... | 343/788 |

* cited by examiner

*Primary Examiner* — Tan Ho
(74) *Attorney, Agent, or Firm* — Husch Blackwell LLP

(57) ABSTRACT

The present invention relates to an antenna device (10) for executing several functions, particularly a transmitting function, a receiving function, and an energy transmitting function, comprising a rod core (20) made from a material that can be magnetized, extending along a rod core axis (22) and at least one rod core winding (24) about the rod core axis (22), a charged core (30) from a material that can be magnetized, extending along a charged core axis (32), and at least one charged core winding (34) about the charged core axis (32), with the charged core axis (32) and the rod core axis (22) being arranged angular in reference to each other.

9 Claims, 5 Drawing Sheets

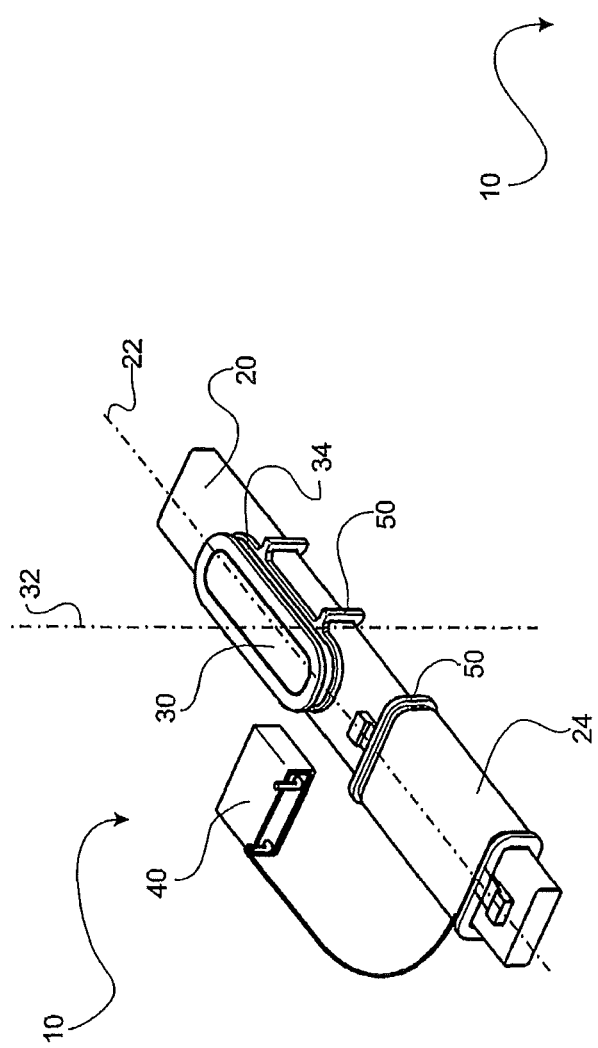
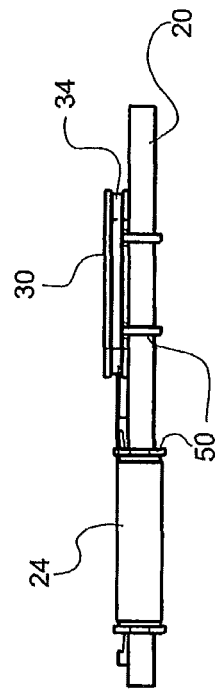
Fig. 2a
Fig. 2b

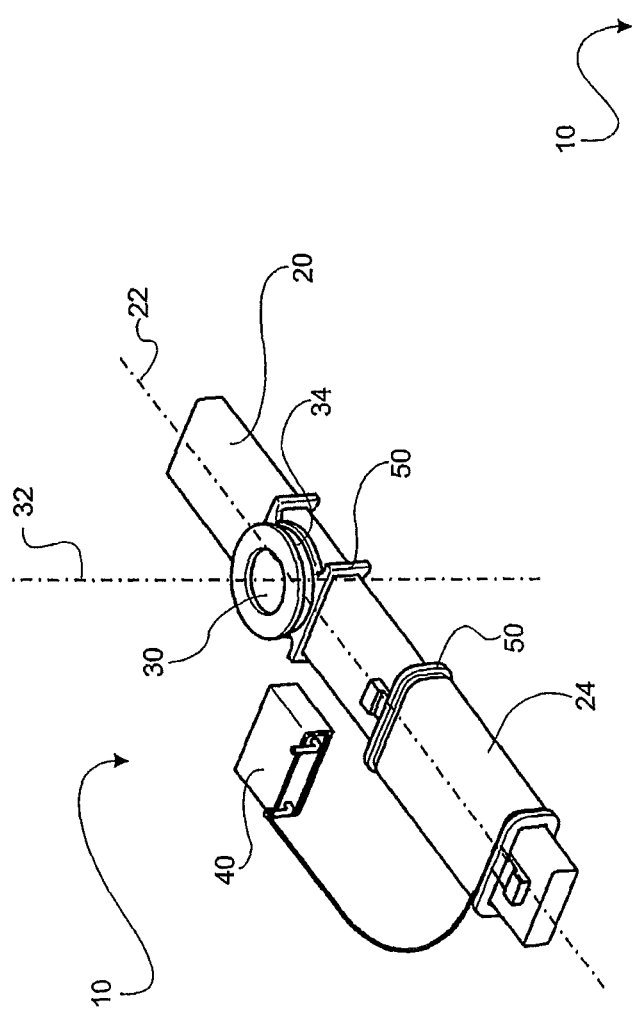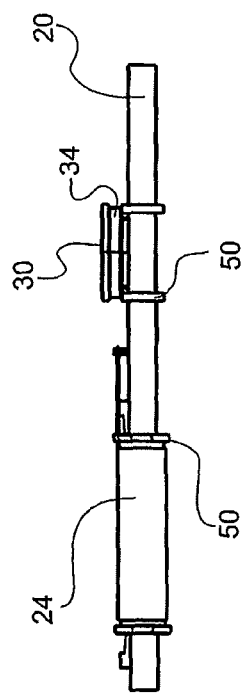
Fig. 3a
Fig. 3b

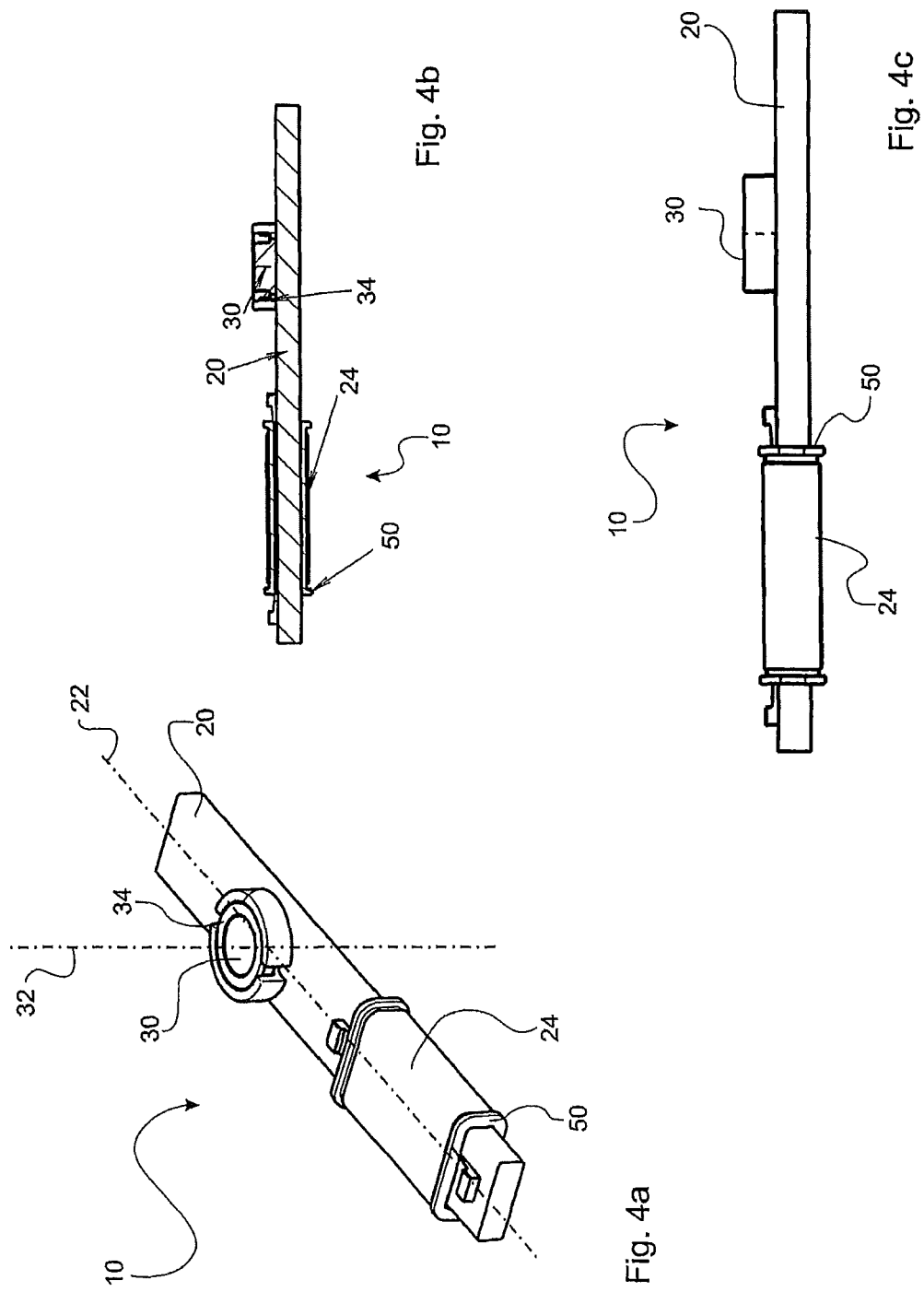

ANTENNA WITH ANGLED CORE APPARATUS AND METHOD

CROSS REFERENCE TO RELATED APPLICATIONS

This application claims priority through German Application No. 10 2011 104 878.6 filed Jun. 7, 2011.

BACKGROUND OF THE INVENTION

The present invention relates to an antenna device for performing various functions, particularly a transmitting function, a receiving function, and an energy transfer function, as well as a vehicle comprising such an antenna device.

Antenna devices, particularly for vehicles, are known per se. They are used to allow the communication between the vehicle and communication means, such as the key for a vehicle. Here, depending on functionality and desired result, various functionalities are known for the vehicle. For example, a so-called keyless entry functionality is suitable for opening and closing a vehicle. This means that the vehicle driver and key holder can open the vehicle with said key without operating any mechanic lock. This is known in a manner in which the vehicle already opens when the vehicle driver with the key approaches the vehicle. It is also known that the vehicle driver, holding the key, inside the vehicle automatically is granted permission for starting the engine of the vehicle (so-called function keyless go). For this purpose, usually an antenna is provided in the vehicle or at the vehicle which allows the desired communication between the key and a control unit.

Furthermore, additional antennas are provided in known vehicles in order to fulfill other functions. Such a function is, for example, an emergency opening or emergency starting function, that is, in case the battery of the key required for sending signals is dead. In such a case the key is held by the vehicle driver at a certain position and fulfills in this position in the proximity of such an antenna the desired opening function of the vehicle or the release of the engine for starting.

SUMMARY OF THE INVENTION

In known antenna devices for vehicles it is disadvantageous that they are accompanied with a high degree of complexity. In particular, a separate antenna must be provided for each functionality so that a multitude of components increase the weight of the vehicle and the wiring between the individual components requires a complex structure. Furthermore, the number of components also increases the costs. Additionally, in vehicles of prior art it is not possible that keys, that is, communication means, comprising a battery, can be recharged in the vehicle without any mechanical contact occurring, such as the insertion of the key into a lock.

The objective of the present invention is to correct the above-stated disadvantages of antenna devices of prior art. In particular, the objective of the present invention is to provide an antenna device for performing various functions, in particular a transmitting function, a receiving function, and an energy transmission function which provides in a cost-effective and simple manner a bundling of several functionalities, in particular for a vehicle. Additionally, it is also the objective to provide a respective vehicle.

The above objective is attained by an antenna device with the features of the independent claim 1 as well as a vehicle with the features of the independent claim 10. Additional features and details of the invention are discernible from the dependent claims, the description, and the drawings. Here, features and details described in the context of the antenna device according to the invention are of course also to be seen in the context of the vehicle according to the invention and vice versa, so that regarding disclosure mutual reference is made, or can be made, to the individual aspects of the invention.

An antenna device according to the invention is embodied particularly for executing different functions, particularly a transmitting, receiving, and energy transmitting function. For this purpose, the antenna device comprises a rod core made from a material that can be magnetized extending along a rod core axis. Furthermore, at least one rod core winding is provided about the rod core axis. This means that the rod core winding, comprising an electrically conductive material, is wound about a rod core around the rod core axis. Therefore, a charged core made from a material that can be magnetized is provided, which shows an extension along a charged core axis. The charged core is also provided with a charged core winding about the charged core axis. According to the invention the charged core axis and the rod core axis form an angle in reference to each other, thus they are not parallel.

With the help of an antenna device according to the invention, a multitude of functions can be provided, combined with the help of a single, compact, and cost-effective antenna device. This way, using different switching combinations of the rod core, the rod core winding, the charged core, and the charged core winding, different functions of the antenna device can be generated, without having to perform any constructive changes. Within the scope of the present invention, particularly three basic functionalities are created here, which are explained in the following.

The function I shall be understood as an emergency-starting function. This is particularly embodied for the close-range communication, for example embodied as inductive coupling. It serves both as a transmitting function as well as a receiving function and furthermore serves to transfer energy. This becomes necessary when a communication means, for example the key of a vehicle, shows a dead battery and the standard functionality for starting the vehicle via the transmission signal cannot be ensured any longer. In such a case the communication means, thus for example the key of the vehicle, can also be embodied for a passive transceiver function. This can be embodied, for example, by passive RFID transponders. For this purpose, additional energy is transmitted for the transceiver process in order to allow even a passive key with a dead battery to generate the desired transceiver functionality.

Function II shall be understood as a standard function, which for example can be described as a keyless go or keyless entry. It may transmit via different frequencies, for example at a range of 125 KHz. The receipt is possible in the same or in different frequency ranges, for example at 315 MHz or 433 MHz. Keyless go and keyless entry represent, as already described at the outset, a communication between a key and the antenna device in such a manner that, for example, the motor of a vehicle is released for starting or the vehicle doors are unlocked. The function II therefore represents a communication not only relating to the close range of the antenna device itself but also to a range exceeding this close range. In particular, here the passenger cabin of a vehicle is covered by at least three-fourths or entirely. It is also advantageous to allow for the functionality of the function II according to the invention to be performed up to two or more meters around the vehicle.

Within the scope of the present invention, the function III represents a charging function. Here, no transmitting or receiving occurs; rather, exclusively the transfer of energy is performed. This is preferably provided by way of an inductive coupling so that placing the key onto the antenna device according to the invention leads to the battery or any energy storage unit contained therein being recharged by the inductive coupling and thus via the antenna device.

In an antenna device according to the invention, a multitude of functions, particularly the functions I, II, and III can be performed with a single antenna device. Here, the charged core extending angular in reference to the rod core serves as an inducing coupling element for the energy transmission. Thus, the charged core and the charged core winding are particularly used for the functions I and III. Both cases relate therefore to a communication or energy transmission in the close range around the antenna device.

For the transmission of data, that is, the transmitting and receiving of data, according to the invention particularly the rod core and the rod core winding are to be used. Here, they may be considered the antenna, by which the desired data can be transmitted and received. This antenna serves therefore to fulfill the function II. For the communication in the close range, thus for fulfilling the function I, furthermore preferably a coupling of the use of the rod core and the charged core as well as the respective winding is provided.

In an antenna device according to the invention, the rod core and the charged core may be in a physical contact. In general, it is also possible that these two cores may be arranged separated from each other by an air gap. By using the rod core in an angular arrangement in reference to the charged core with regards to the respective axis, it is possible that an expansion of the range occurs for the charged core by the embodiment of the rod core. In other words, the rod core leads to a magnetic field, which is generated by the combination of the charged core and the charged core winding, representing the guiding means for this magnetic field. This way the magnetic field, which can be generated from the charged core and the charged core winding, is expanded so that for the inductive coupling in a charging process, or generally for the energy transmission process, a wider area is provided in which the inductive coupling can occur with the desired energy transmission.

Within the scope of the present invention, the transceiver functions occur preferably at different frequencies. In particular the functions I and II are embodied with different frequency ranges.

It may be advantageous for the charged core and the rod core to be connected to each other in an antenna device according to the invention. In other words, in such an embodiment the charged core and the rod core are physically contacting each other. This contact may be direct or indirect and particularly avoids any air gap. Here, the connection material, for example present in the form of an adhesive, preferably shows a high magnetic permeability so that a magnetic isolation, potentially hindering the expansion of the magnetic field for the charged core and the charged core winding, is suppressed.

Further, it may be advantageous in the antenna device according to the invention for the charged core and the rod core to be embodied in one piece, particularly integrally. This leads to the charged core to be embodied quasi as a knoll, particularly a charging knoll, on the rod core. The integral or one-piece embodiment offers the advantage that the production process can be performed in a particularly cost-effective manner. Any connection step as well as a separate production step for one of the two components is here omitted.

Another advantage may develop in an antenna device according to the invention when the charged core axis and the rod core axis are aligned perpendicular or essentially perpendicular in reference to each other. The term "essentially perpendicularly" represents here an angular range of 90°+/−15°. Of course, narrower angular ranges are also possible within the scope of the present invention, such as 90°+/−10° or 90°+/−5°. The perpendicular or essentially perpendicular alignment of the core axes in reference to each other is advantageous such that on the one hand a particularly effective expansion occurs of the magnetic field of the charged core and the charged core winding and on the other hand a sufficient directional effect of the magnetic field is given. This way it can be ensured that in the close range communication, particularly for the step of energy transmission, the required amount of energy can be transmitted as desired without any major loss.

In order to achieve an even better field control it may be advantageous for the charged core to be at least sectionally embodied as a pot core in an antenna arrangement according to the invention. In such an embodiment, at least sectionally, a pot is formed about the charged core winding, which is also produced from a material that can be magnetized. This leads to improved field guidance of the magnetic field in a direction along the charged core axis so that the loss of the magnetic field with regards to the energy transmission function can be further minimized.

Another advantage may develop when in an antenna device according to the invention a condenser, particularly a pure resonance condenser, is provided which contacts the rod core winding in an electrically conductive manner. This way, improved communication can occur when using the function II and the function I.

It is also advantageous for the rod core winding in an antenna device according to the invention to comprise at least two sections, with these two sections being located at two different sides of the charged core axis. The two sections are here embodied particularly symmetrical in reference to the charged core axis. This way, an essentially symmetrical magnetic field can also be achieved for the rod core, so that here at both sides of the charged core axis an even magnetic field can be formed and furthermore a homogenous expansion of the magnetic field of the charged core and the charged core winding can occur. Accordingly, this embodiment leads to an improved field guidance of both magnetic fields, particularly with regards to the installation situation of the antenna device. If components are provided around the antenna device, which also can be magnetized, the improved field guidance then leads particularly to prevent any magnetic short circuitry in such a surrounding component in an undesired manner.

Within the scope of the present invention it is also advantageous when in an antenna device according to the invention the charged core winding and/or the rod core winding each are wound about a connecting body, connected to the rod core and/or the charged core. Such a connecting body can be connected, for example, via a snap-in connection to the rod core or the charged core. A form-fitting connection, for example by pushing the connecting body over the respective core, is possible within the scope of the present invention. An essentially complete form-fitting connection, for example by a complete surface-molding process of the respective core with a plastic material, is also possible within the scope of the present invention. The use of a connecting body is advantageous such that the respective connecting bodies may be provided separately with the respective winding, that is, with the charged core winding or the rod core winding. This facilitates the production of these windings. Additionally, preferably standard windings may be used, which with the help of a connecting body, quasi in the function as an adapter, can be placed upon the rod core and/or a charged core of an antenna device according to the invention. The assembly is particularly facilitated in the snap-in connection or the use of a partial form-fitting connection by pushing over such that the production costs can also be minimized. In particular, the generation of the respective winding can also occur in an automated form.

It is also advantageous in an antenna device according to the invention if it is embodied for an arrangement in a vehicle, particularly its center console, in order to perform the following functions:

Emergency function of a transceiver function with a simultaneous energy transmission,
Transceiver function without any energy transmission,
Energy transmission function without any transceiver function.

The above-stated three functions are basically equivalent to the functions I, II, and III as explained above in greater detail. Using an appropriate combination of functionalities, a single antenna device according to the present invention can provide a multitude of functionalities without increasing the complexity, weight, and production costs of this device in an otherwise necessary manner.

If applicable, the objective of the present invention is a vehicle comprising at least one antenna device according to the invention. A vehicle according to the invention accordingly shows the same advantages as explained above in detail with regards to the antenna device.

PREFERRED EXEMPLARY EMBODIMENTS OF THE INVENTION

The present invention is explained in greater detail based on the attached figures of the drawing. Here, the terms used "left," "right," "top," and "bottom" refer to the alignment of the figures of the drawing with normally readable reference characters.

BRIEF DESCRIPTION OF THE DRAWINGS

In the figures:

FIG. 2a shows, in a schematic illustration and perspective view, another embodiment of the antenna device according to the invention, FIG. 2b shows the antenna device of FIG. 2a in a schematic side view, FIG. 3a shows another embodiment of an antenna device according to the invention in a schematic illustration and perspective view, FIG. 3b shows the antenna device of FIG. 3a in a side view, FIG. 4a shows another embodiment of an antenna device according to the invention in a schematic and perspective illustration, FIG. 4b shows the antenna device of FIG. 4a in a schematic cross-section, FIG. 4c shows the antenna device of FIG. 4a in a schematic side view.

DETAILED DESCRIPTION OF THE PREFERRED EMBODIMENT

Figure 1B:
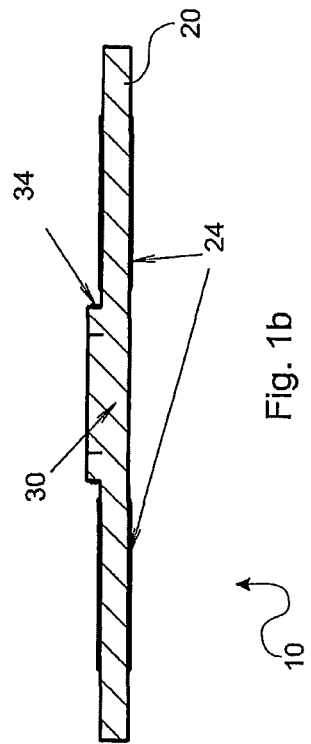
FIG. 1b shows the antenna device of FIG. 1a in a schematic cross-section.

FIGS. 1a to 4c show four different embodiments of an antenna device 10 according to the invention. In the description regarding these individual embodiments, identical reference characters mark identical components so that the respective components for the individual embodiments also fulfill the same or similar functions and it is not necessary to describe them in detail for each embodiment.

Figure 1C:
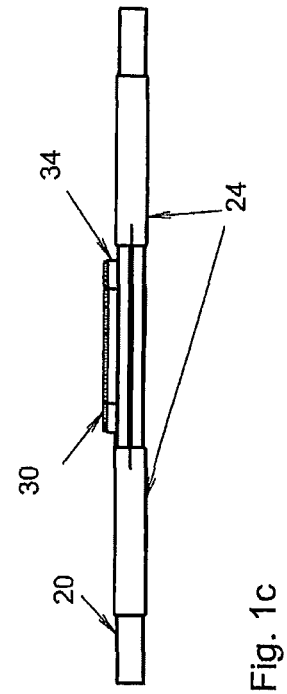
FIG. 1c shows the antenna device of FIG. 1a in a schematic side view.
Figure 1A:
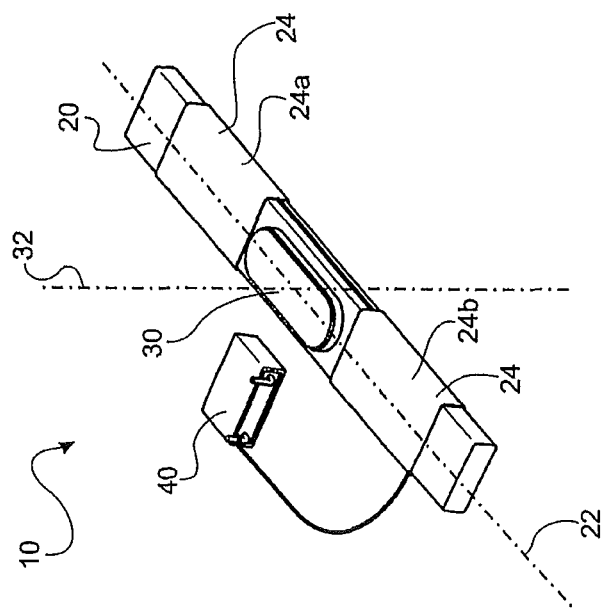
FIG. 1a shows, in a schematic illustration in a perspective view, a first embodiment of an antenna device according to the invention.

FIGS. 1a to 1c show a first embodiment of an antenna device 10 according to the invention. It is discernible in FIG. 1a that a rod core 20 and a charged core 30 are arranged in reference to each other such that the charged core axis 32 and the rod core axis 22 are in an angular situation in reference to each other. This is particularly such that here a 90° angle is given. As discernible in FIG. 1b, the charged core 30 and the rod core 20 are embodied integrally and in one piece. Both of them are produced from a material that can be magnetized, particularly ferrite. The charged core 30 can here be particularly called a charged core knoll, because due to the one-piece embodiment no additional connection is required between the two cores 20 and 30.

The rod core winding 24 with two sections 24a and 24b of the rod core winding 24 is located symmetrically around the charged core 30, particularly the charged core axis 32. By this symmetry, an expansion of the magnetic field is possible in a symmetric fashion, which is created by the charged core 30 and the charged core winding 34 surrounding it. Further, in this embodiment, similar to the embodiments of FIGS. 2a through 3b, a condenser 40 is provided, which is connected to the rod core winding 24 in an electrically conductive fashion. It serves to further improve the communication, thus the transceiver function.

FIGS. 2a and 2b show an alternative embodiment. This embodiment also relates to an integral, thus one-piece embodiment of the two cores 20 and 30. However, this embodiment differs from the one shown in FIGS. 1a through 1c in that two connecting bodies 50 are used in order to fasten the rod core winding 24 or the charged core winding 34 at the rod core 20 or the charged core 30. These connecting bodies 50 are preferably embodied from plastic and fastened in different manners at the respective core 20 and 30. The connecting body 50 carrying the charged core winding 34 is snapped via four latching projections as a snap-in connection on the rod core 20 around the charged core axis 32. An axial displacement along the rod core axis 22 is here prevented in that the charged core 30 projects through an opening into the connection body 50 along the charged core axis 32.

The connecting body 50 for the rod core winding 24 is at least sectionally embodied in a form-fitting manner such that it has been applied by way of pushing over the rod core 20. When using the connecting body 50 the respective windings 24 and 34 can be produced at separate positions and particularly in an automated fashion. The completed windings 24 and 34 can not only be transported easier with the help of the connecting body 50 but also connected in a simple and cost-effective manner with the respective core 20 or 30.

FIGS. 3a and 3b show an alternative embodiment in reference to FIG. 2a such that the charged core 30 no longer shows any oblong embodiment but is essentially annularly. Otherwise, this embodiment is also provided with connecting bodies 50 so that essentially the same functionality is given.

FIGS. 4a and 4c show an embodiment in which the two cores 20 and 30 are embodied separated from each other. Here, both of them are produced from a material that can be magnetized, particularly ferrite. Another difference is particularly discernible from FIGS. 4a and 4b. In this embodiment, the charged core 30 is embodied as a pot core such that the charged core winding 34 is surrounded at the circumference by a material that can be magnetized. This leads to the ability of an even further improved guidance of the generated magnetic field about the charged core 30 and the charged core winding 34.

One embodiment as shown in each of FIGS. 1a through 4c particularly is arranged or can be arranged inside a vehicle, preferably in the area of the central console. This arrangement provides the advantage such that all functions described in the introduction as functions I, II, and III can be fulfilled. In order to fulfill the standard function II the rod core 20 serves as the antenna for transmitting and receiving data or information. In order to allow a charging function (function III), the respective charged core 30 and the charged core winding 34 are used. Via inductive coupling, this way using the expanded magnetic field energy can be transmitted and the respective battery or energy storage unit can be charged. In order to allow providing an emergency starting function (function I) the inductive coupling of the charged core 30 is combined with the antenna function of the rod core 20.

Figure 5:
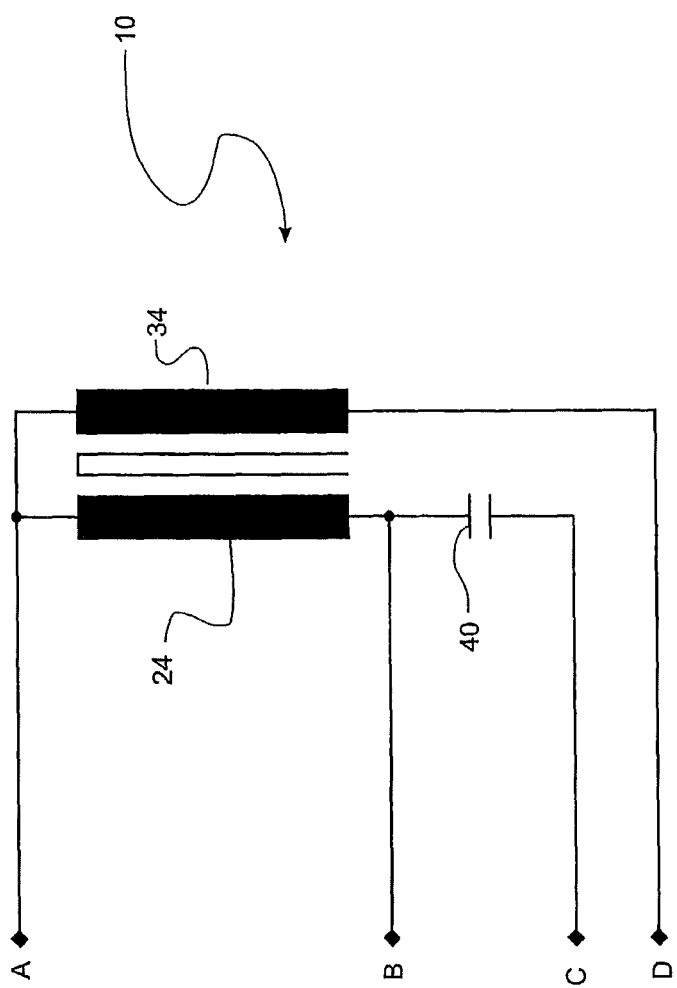
FIG. 5 shows, in a schematic illustration, an option for the connection combination of an antenna device according to the invention.

FIG. 5 schematically shows an embodiment in which the connection means is shown which may be embodied in an antenna device according to the invention. For this purpose, particularly four connection means A, B, C, and D are provided. In this embodiment of the antenna device 10 a charged core winding 34 and a rod core winding 24 are connected to the connection A in an electrically conductive fashion. Furthermore, a condenser 40 is provided between the connectors B and C. In order to allow performing the individual functions I, II, and III the following switching occurs.

For the function I, i.e., the emergency starting function, the connectors A, B, and C are switched to each other. For the function II the connections A and C are switched to each other. For the charging function III the connectors A and B or A and C are switched to each other.

The above explanations describe the present invention only within the scope of examples. Accordingly, the described features, to the extent technically beneficial, can be freely combined with each other without leaving the scope of the present invention.

REFERENCE LIST 10 antenna device
20 rod core
22 rod core axis
24 rod core winding
24a section of the rod core winding
24b section of the rod core winding
30 charged core
32 charged core axis
34 charged core winding
40 condenser
50 connecting body
A connector
B connector
C connector
D connector

The invention claimed is:

1. An antenna device for performing functions, including at least a transmission function, a receiving function, and an energy transfer function, comprising:
   a rod core made from a material that can be magnetized with an extension along a rod core axis;
   at least one rod core winding around the rod core axis;
   a charged core made from a material that can be magnetized with an extension along a charged core axis;
   at least one charged core winding around the charged core axis with the charged core axis and the rod core axis being arranged at an angle in reference to each other; and
   a serial resonance condenser, said serial resonance condenser contacting said rod core winding in an electrically conductive fashion.

2. The antenna device of claim 1, wherein the charged core and the rod core are connected to each other.

3. The antenna device of claim 1, wherein the charged core and the rod core are formed integrally in one piece.

4. The antenna device of claim 1, wherein the charged core axis and the rod core axis are arranged substantially perpendicular to each other.

5. The antenna device of claim 1, wherein the charged core is embodied at least sectionally as a pot core.

6. The antenna device of claim 1, wherein the rod core winding comprises at least two sections, with these two sections being located on two different sides of the charged core axis.

7. The antenna device of claim 1, wherein at least one of the charged core winding and the rod core winding are wound about a connecting body, which is mechanically connected to at least one of the rod core and the charged core.

8. The antenna device of claim 1, wherein it is embodied for installation in a vehicle, particularly in its center console, in order to perform the following functions: emergency function of a transceiver function with a simultaneous transfer of energy, transceiver function without any energy transfer, and energy transfer function without any transceiver function.

9. The antenna device of claim 1, further comprising a vehicle having said at least one antenna device.

\* \* \* \* \*